Dec. 29, 1964 F. T. SCALERA 3,163,429

TONE ARM MOUNTING ASSEMBLY

Filed April 6, 1962 2 Sheets-Sheet 1

INVENTOR.
FRANK T. SCALERA
BY
Amster & Levy
ATTORNEYS

Dec. 29, 1964 F. T. SCALERA 3,163,429

TONE ARM MOUNTING ASSEMBLY

Filed April 6, 1962 2 Sheets-Sheet 2

INVENTOR.
FRANK T. SCALERA
BY Amster & Levy
ATTORNEYS 3,163,429

TONE ARM MOUNTING ASSEMBLY

Frank T. Scalera, Maplewood, N.J., assignor, by mesne assignments, to General Electric Company, a corporation of New York Filed Apr. 6, 1962, Ser. No. 185,696
11 Claims. (Cl. 274—23)

The present invention relates generally to phonograph record equipment and specifically to an improved mounting means for a phonograph tone arm.

The standard tone arm in a record changer of either the automatic or manual type requires mounting means provided for rotation of the tone arm about a vertical axis and further rotation of the tone arm about a horizontal axis to provide movement respectively radially and vertically of a phonograph record rotating on the phonograph turntable. A great many different designs have been developed to provide these simple requisites.

However, further essential requirements must be taken into consideration. Two simple door hinges placed at 90° angles to each other would be sufficient to provide rotation about a vertical and about a horizontal axis. However, a tone arm is a piece of audio equipment and the special function of the tone arm must be considered. The stylus at the end of the tone arm receives vibratory impulses from the grooves of a phonograph record which impulses are transmitted as electrical signals to an electronic amplifier. It will be readily appreciated that the mounting means for the phonograph stylus must provide a firm and even support for the pickup cartridge as it picks up a signal from a phonograph record.

The tone arm must itself be mounted with sufficient rigidity such that random vibrations will not be introduced to the whole phonograph assembly. In addition, the pivotal motions of the tone arm, both vertically and horizontally, must be smoothly accomplished by the application of only the slightest forces on the tone arm thus to enable the phonograph stylus to evenly track within a phonograph groove. Further, it is desirable that the horizontal and vertical movements of the tone arm, with respect to the body upon which the tone arm is mounted, be reliably repeatable. For example, it is desirable that the movement of the mounting means be such that the setting down of the tone arm at the edge of a record be the same time after time. Therefore, it is desirable that the bearing points in the mount maintain their relative relationships.

As a still further requirement for the mounting means of a phonograph tone arm, the ease of manufacture of the device must be given careful consideration. It is the continuing attempt of all the manufacturers of phonograph equipment to provide a high quality product capable of being produced by mass production techniques with a minimum per-unit cost. In this regard it is undesirable to include in a phonograph design components which need careful hand adjustment or which must be produced with fine tolerance limits.

Accordingly, it is an object of the present invention to provide an improved tone arm mounting assembly. Specifically, it is an object of the present invention to provide mounting means for a phonograph tone arm to provide smooth and unopposed rotation of a tone arm about a horizontal and vertical axis wherein the relationship of moving parts remains predictably constant.

It is a further object of the present invention to provide a mounting means for a phonograph tone arm including bearing means for rotation about a horizontal axis having relatively small clearance between moving parts without requiring fine tolerance manufacturing and including simple adjustment features which may be provided at a relatively low manufacturing cost.

In accordance with one illustrative embodiment of the present invention there is provided a mounting assembly for a tone arm including a tone arm support bracket rotatable about a fixed vertical axis. A tone arm is secured to a tone arm pivot bracket which includes a pair of downwardly extending parallel extensions having aligned pivot pin-receiving openings. The support bracket is provided with complementary upstanding parallel projections which are spaced inwardly of the downward extension of the pivot bracket and which are similarly provided with aligned pivot pin-receiving openings. One of the downward extensions of the pivot bracket is further provided with a pin-locating surface spaced outwardly from the extension and aligned with the pin-receiving openings. A pivot pin, having one end shaped to provide a substantially point contact, is positioned through the aligned respective pin-receiving openings with the point contact located against the pin-locating surface. Clamping means is provided on the support bracket for positively locating the pivot pin and spring bias means may be provided to insure contact of the bearing point with the pin-locating surface. The tone arm pivot bracket is mounted by bearing means on a vertical shaft having substantially spherical upper end and is supported thereon by the engagement of the pivot pin and the upper end of said shaft.

The above brief description as well as further objects, features and advantages of the present invention will be best appreciated by reference to the following detailed description of a presently preferred embodiment when taken in conjunction with the accompanying drawings wherein.

Figure 1:
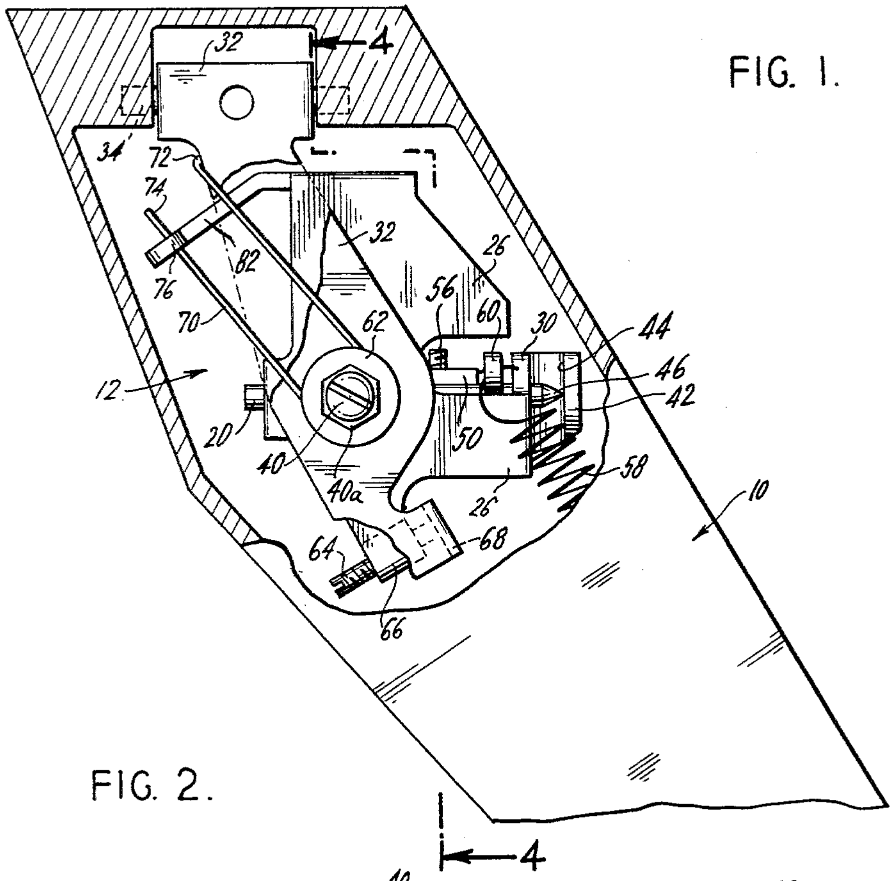
FIG. 1 is a plan view of the rear portion of a tone arms with portions broken away illustrating a tone arm mounting assembly according to the present invention.

Referring now specifically to the drawings, there is shown a tone arm 10 provided with mounting means 12 to mount the tone arm 10 on a phonograph chassis (not shown). Extending upwardly from the chassis is a fixed vertical shaft 14 about which is pivoted the tone arm support bracket or mounting yoke 16 for pivotal motion about the central axis of the vertical tone arm post 14. The tone arm support bracket 16 is provided with a pair of horizontal extensions 18 (only the upper one being shown in the drawings herein) which are received about the shaft 14 for rotary motion thereabout. The tone arm support bracket 16 is located along the length of the shaft 14 by engagement of the upper end 14*a* of the shaft 14 with the pivot pin 20 which is received within pin-receiving openings formed in a pair of upstanding parallel projections 22, 24 as will be further described below. The upper end of the shaft 14 may be provided with a generally spherical shape 14*a* such that a small contact area is produced between the shaft 14 and the pivot pin 20 thus assuring relatively free rotation of the tone arm support bracket about the shaft 14.

The tone arm 10 is mounted on the support bracket 16 by means of a tone arm pivot bracket 26 which has a pair of downwardly extending ears 28, 30 each of which is provided with aligned pin-receiving openings through which is received the pivot pin 20. It will be appreciated that the pivot bracket 26, through the ears 28, 30 pivots about the pin 20 which in turn is mounted on the tone arm support bracket 16. The tone arm pivot bracket 26 is secured to the frame of the tone arm 10 by means of the adjustment and securement bracket 32. The adjustment and securement bracket 32 includes means to adjust the set down position of the tone arm, but for the purposes of the present discussion the bracket 32 may be considered to be unitary with the tone arm pivot bracket 26. The securement bracket 32 is in turn connected to the frame of the tone arm 10 by means of a pivot pin 34 mounted within the frame of the tone arm 10 which is engaged within the depending ears 36, 38 of the securement bracket 32. The pivotal mounting of the tone arm 10 on the bracket 32 allows the arm 10 to be swung upwardly through 90° such that access may be had to the pick up cartridge and other items on the underside of the tone arm 10. However, in normal use the tone arm 10 does not pivot about the pin 34, but makes essentially a fixed assembly with the mounting bracket 32 and the pivot bracket 26. In normal record playing operation, the tone arm 10 pivots solely about pin 20 and about the vertical shaft 14. As may be best seen in FIGS. 2 and 4, the fixed position between the tone arm 10 and the securement bracket 32 is defined by the engagement of the top wall of the tone arm 10 with the head of a screw 40 which provides one of the positioning adjustments for the tone arm 10 as will be described below.

Figure 2:
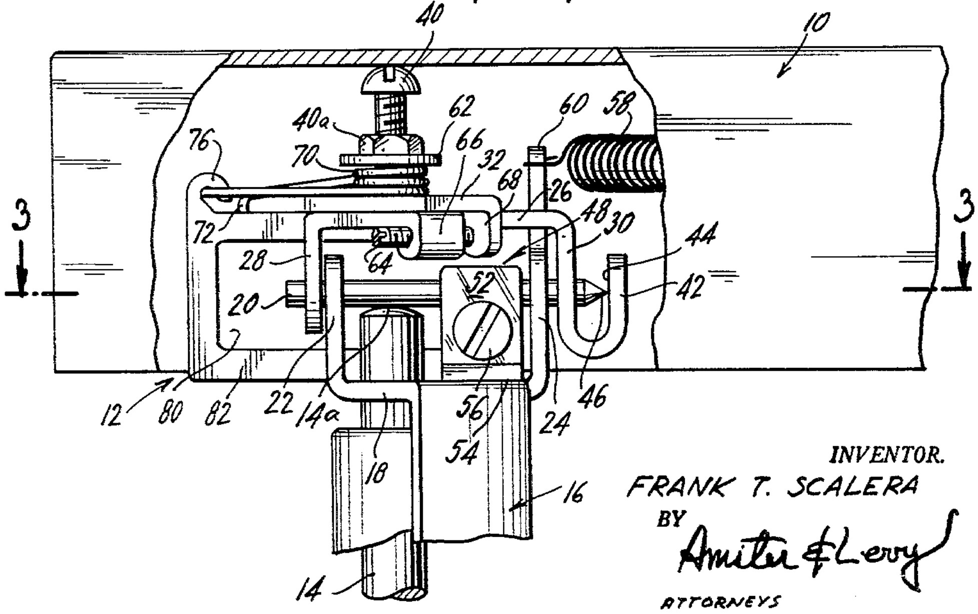
FIG. 2 is an elevational view of the device illustrated in FIG. 1 viewed from the lower edge of FIG. 1 with portions of the tone arm broken away to illustrate the mounting assembly.

Description will now be specifically made of the pivot pin 20 in engagement with the upstanding projections 22, 24 of the tone arm support bracket 16 and the ears 28, 30 of the pivot bracket 26. For this description, it may be considered that the tone arm 10 is rigidly secured to the pivot bracket 26 and that the tone arm support bracket 16 is mounted for rotation about a vertical axis. As best seen in FIG. 2, one of the downward extensions of the pivot bracket 26, namely extension 30, is provided with a U-shaped integral member 42 which provides a reference surface 44 aligned with and facing the pin-receiving opening of the downward extension 30. The pivot pin 20, as described above, is received within the aligned pin-receiving openings of the upward projections 22, 24 and the downward extensions 28, 30 thus providing a pivotal connection between the pivot bracket 26 and the tone arm support bracket 16. One end of the pivot pin 20 is shaped to provide an essentially point bearing contact 46. In the present illustrative embodiment, the point 46 is formed by a conical portion at one end of the pin 20. The point 46 of the pin 20 is located against the reference surface 44 and, by the appropriate adjustment of the pin 20, may produce a zero or very small order clearance between the pin and the pin-locating surface 44.

A pivot pin clamp 48 is provided to securely locate the pivot pin 20 with respect to the tone arm mounting bracket 16. The pivot pin clamp 48 includes an upwardly extending member 50 integral with the extension 18 of the bracket 16 and a second parallel upstanding member 52 which in the present case, is welded to the extension 18 of the bracket 16 as indicated at 54. A clearance opening is formed in the member 52 and a threaded hole is provided in the member 50 which receives a clamping screw 56. It will be appreciated that after the pin 20 has been inserted within the upstanding projections 22, 24 of the support bracket 26, a clockwise rotation of the clamping screw 56 will draw the members 50, 52 of the clamp 48 toward each other thereby clamping the pin 20 rigidly with respect to the mounting bracket 26. The pin 20 is preferably made of a relatively hard metal and the clamp 48 of a relatively soft material such that the constructions do not exhibit a clamping memory. Thus, the position of the pin 20 with respect to the mounting bracket 16 may be varied by release of the clamping screw 56, movement of the pin 20 and the reclamping of the clamp 48.

The adjustment of the position of the pin 20 within the tone arm mounting assembly 12 will now be described to provide a further understanding of the operations and advantages of the present invention. With the clamp 48 in a released position, the pin 20 is inserted within the pin-receiving openings of the various extensions and projections as may be best seen in FIG. 2. The point at the end of the conical section 46 of the pin may be placed, by finger pressure or otherwise, at a zero clearance location with respect to the reference surface 44 of the U-shaped member 42 and the assemblies moved with respect to each other to obtain a controlled clearance between the downward extension 28 and the upstanding projection 22 as is further explained below. The clamping screw 56 may then be rotated to firmly clamp the pin 20 with respect to the mounting bracket 16. It will be appreciated that if the pivot bracket 26 is biased to the left with respect to the support bracket 16, or alternatively, if the support bracket 16 is biased to the right with respect to the pivot bracket 26, the tone arm 10 will be mounted upon the tone arm support bracket 16 by the pin 20 with the single, zero clearance thrust bearing formed by the pointed end 46 of the pin 20 engaged against the reference surface 44. In the present illustrative embodiment a biasing force is exerted by the balance spring 58 which is secured at one end to a spring support 60 on the support bracket 16 and at the other end (not shown) to the tone arm 12. The primary function of the balance spring 58 is to provide the proper stylus pressure. However, in the present illustrative embodiment, it will be appreciated that the spring 58 is sprung between the support bracket 16 (through the spring mount member 60) and the pivot bracket 26 (through the case of the tone arm 10 and through the securement bracket 32). Since the spring 58 is at an angle to the pin 20, the point 46 of the pivot pin 20 is maintained in engagement with the reference surface 44 and a controlled clearance is maintained between the downward extension 28 of the pivot bracket 26 and the upward projection 22 of the mounting bracket 16.

In situations wherein a biasing force is not exerted between the pivot bracket 26 and the tone arm support bracket 16, a second bearing surface may be formed between the inner face of the downward extension 28 and the outer face of the upward projection 22. Such a bearing may be formed by the provision of a shoulder on one of those two surfaces, by a low friction washer interposed therebetween, or by any one of several well known bearing means.

The pivot pin 20 may be located with respect to the mounting bracket 16 and the clamp 48 during the assembly of the tone arm mounting means 12 by one of several relatively simple processes. It is normally desirable to incorporate a small clearance in the axial direction. This clearance may be introduced by feel or by use of a feeler gage applied either between the pin 20 and the surface 44 or the projection 22 and extension 28. Alternatively a zero clearance may be produced by finger pressure; the clamp 48 may then be secured, and then the outer side of the U-shaped member 42 may be pressed or tapped toward the point 46 to form a slight bearing depression on the surface 44 to produce the desired small clearance. When the assembly is completed and the biasing force exerted upon the assembly, any clearance between the point 46 and the surface 44 will be reduced to zero and a corresponding clearance will develop between the adjacent upstanding projection and depending extensions. Of course, a variety of other assembly techniques will occur to one skilled in the art for easy assembly of these structures.

Figure 4:
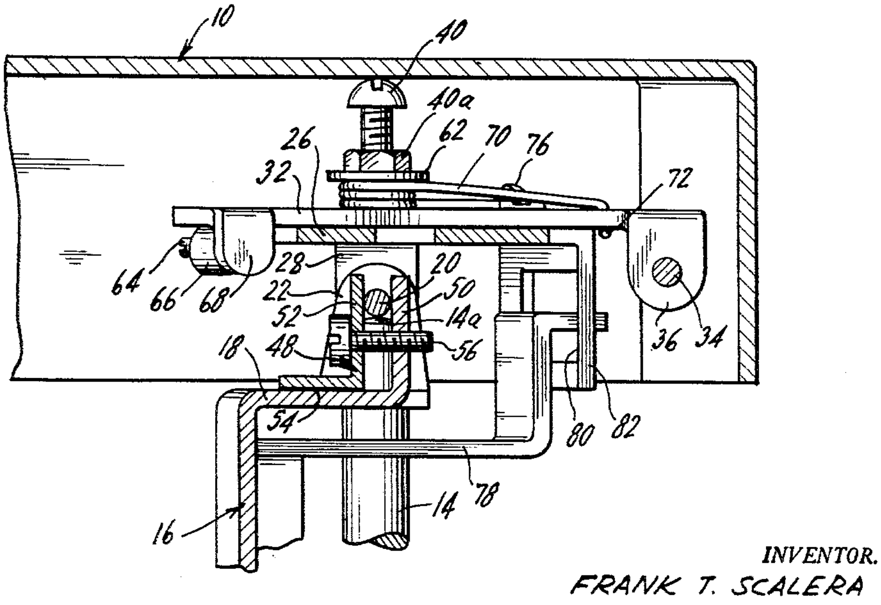

Reference will now be made to FIGS. 1, 2 and 4 for a brief description of the adjustment features for the tone arm 10. It will be appreciated that in an automatic phonograph it is required that the set-down position of the tone arm be adjustable and, further, that the maximum elevation of the tone arm be adjustable such that the top of the tone arm does not interfere with a stack of records waiting to be dropped onto the phonograph turntable. To provide these requirements, the adjustment and securement bracket 32 is pivotally secured to the pivot bracket 26 by a rivet or other means which may be conveniently provided by an upsettable member on the lower surface (not shown) of the screw-receiving and pivot member 62. It will be appreciated that pivotal motion between the adjustment and securement bracket 32 and the pivot plate 26 will provide pivotal motion of the tone arm 10 with respect to the full mounting assembly 12. In order to control this motion, an adjustment screw 64 is provided within a threaded member 66 formed on the forward portion of the pivot bracket 26. Adjustment screw 64 engages a downward extension 68 on the forward portion of the adjustment and securement bracket 32. It will be appreciated that clockwise rotation of the adjustment screw 64 will push the downward extension 68 away from the threaded member 66 thus causing a counter clockwise rotation of the adjustment and securement bracket 32 with respect to the pivot bracket 26 as viewed in FIG. 1. This will cause an outward movement of the tone arm 10 relative to the turntable. A positive positioning spring 70 is provided to insure contact between the adjustment screw 64 and the extension 68 and is hooked at one end 72 to the adjustment bracket 32 and at the other end 74 to a spring extension 76 of the pivot bracket 26. The spring 70 is conveniently mounted on the screw receiving and pivot member 62. Thus, by the simple adjustment of the screw 64, the set-down location of the stylus at the end of the tone arm 10 may be selectively varied.

Figure 3:
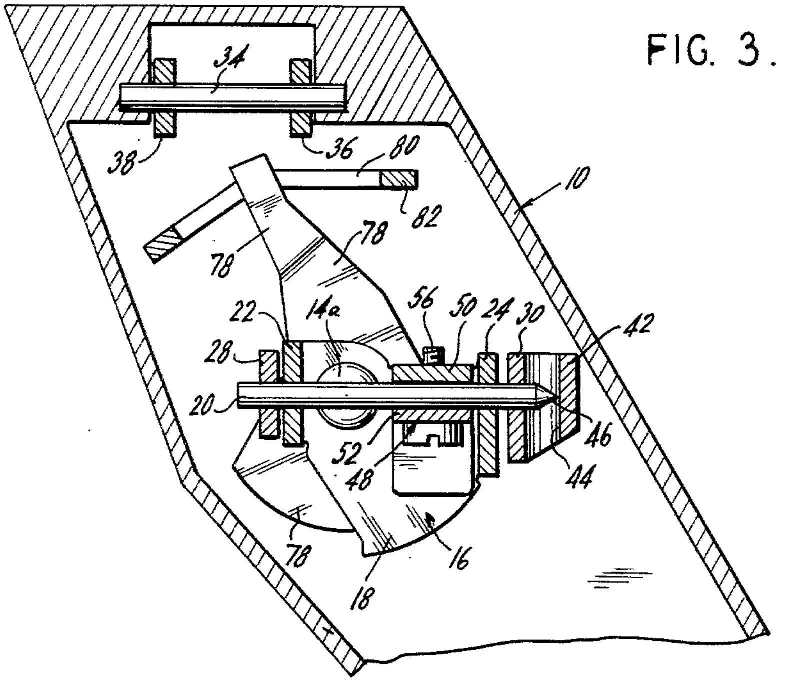
FIG. 3 is a sectional view taken along the line 3—3 of FIG. 2 looking in the direction of the arrows; and, FIG. 4 is a further sectional view taken generally along the lines 4—4 of FIG. 1 and looking in the direction of the arrows.

The screw 40 received within the member 62 on the upwardly facing surface of the adjustment and securement bracket 32 provides an abutment against which the top of the tone arm 10 rests in its normal operating position. Obviously, when the screw 40 is screwed further into the member 62, the height of the end of the tone arm 10 will be decreased. Alternatively, the height of the tone arm 10 may be raised, about the pivot 34, by screwing the screw 40 outwardly from the member 62. The lock nut 40*a* is provided to maintain the adjusted position. Of course, the adjustment of the screws 40 and 64 vary the fixed position of the tone arm 10 with respect to the pivot bracket 26, but in no way alter the relationship between the pivot bracket 26 and the tone arm mounting bracket 16 or alter the functioning of the tone arm mounting assembly 12. The pivot 34 is not used in normal playing operation, but rather, the tone arm pivots about the pin 20. An actuating arm 78 (see FIGS. 3 and 4), which is operatively secured to the record changing mechanisms of the record changer, is received within an opening 80 formed in a downward extension 82 of the pivot bracket 26. The arm 78 functions to move the tone arm during the record changing cycle of the changer.

It will be appreciated that there is provided in accordance with the present invention a tone arm mounting assembly to provide for rotation of a phonograph tone arm about a vertical axis and about a horizontal axis. A fixed vertical shaft is provided and the full tone arm and tone arm mounting assembly is hung upon the shaft for rotation in the horizontal plane. The means for providing rotation about a horizontal axis comprise two simple bracket members interconnected by a pivot pin which may be assembled together in an extremely simple operation and may produce, with one simple manufacturing step, a bearing clearance situation of desirable characteristics. Further, the clearance in the bearing providing the horizontal pivotal motion may be simply and easily adjusted and the total assembly may be produced by mass production techniques at extremely low unit cost. The support of the full assembly on the fixed vertical shaft is given by the interengagement of the horizontal pin with the rounded upper end of the vertical shaft. The constructions illustrated provide an inexpensive and easily assembled bearing means for movement in perpendicular planes wherein a high degree of repeatability in performance is an inherent characteristic.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

What I claim is:

1. A pivotal mount for supporting a tone arm for rotational movement about a horizontal axis comprising a tone arm mounting bracket mounted for rotation about a vertical axis and having formed therein a pair of aligned pin-receiving openings, a pair of parallel depending ears extending downwardly from and secured to said tone arm at one end thereof, said depending ears having a pair of aligned pin-receiving openings formed therein aligned with the respective pin-receiving openings of said mounting bracket, a pivot pin interconnecting said depending ears and said mounting bracket and received within the said pin-receiving openings, said pin having one end of reduced diameter forming a bearing contact, a reference surface operatively engaged with said bearing contact and rigidly secured to one of said depending ears, said reference surface provided by an integral extension of one of said ears, clamp means for securing said pin to said mounting bracket, and biasing means between said mounting bracket and said tone arm for maintaining said engagement between said bearing contact and said reference surface.

2. A pivotal mount for supporting a tone arm for rotational movement about a horizontal axis comprising a tone arm mounting bracket having formed therein a pair of aligned pin-receiving openings, a pair of parallel depending ears extending downwardly from and secured to said tone arm at one end thereof, said depending ears having a pair of aligned pin-receiving openings formed therein, the pin-receiving openings of said ears being aligned with the pin-receiving openings of said mounting bracket, a pivot pin interconnecting said depending ears and said mounting bracket and received within the said pin-receiving openings, said pin having one end of reduced diameter forming a bearing contact, a reference surface operatively engaged with said bearing contact and rigidly secured to said tone arm, clamp means for securing said pin to said mounting bracket, and biasing means for maintaining the engagement of said pivot pin bearing contact with said reference surface.

3. A pivotal mount for supporting a tone arm for rotational movement about a horizontal axis comprising a tone arm mounting bracket, a pivot pin secured to said bracket in a horizontal orientation, bearing means including at least one depending ear extending downwardly from said tone arm and having pin-receiving opening formed therein, said ears being located with respect to said mounting bracket with its pin-receiving opening engaged about said pivot pin, said pivot pin having one end of reduced diameter forming a bearing contact, a reference surface operatively engaged with said bearing contact and secured to said tone arm, and clamp means for securing said pivot pin to said mounting bracket.

4. A pivotal mount for supporting a tone arm for rotational movement about a horizontal axis comprising a tone arm mounting bracket having formed therein a pair of aligned pin-receiving openings, a pair of parallel depending ears extending downwardly from said tone arm at one end thereof and having a pair of pin-receiving openings formed therein which are aligned with the pin-receiving openings of said mounting bracket, a pin interconnecting said depending ears and said mounting bracket and received within the said pin-receiving openings, said pin having one end of reduced diameter forming a bearing contact, a reference surface connected to said tone arm and operatively engaged with said bearing contact, and clamp means for securing said pin to said mounting bracket.

5. In a mounting assembly for a tone arm including a tone arm bracket mounted for rotation about a vertical axis, a pivot pin, means mounting said pivot pin on said tone arm bracket in a horizontal plane, said pivot pin being formed with a bearing contact at one of its ends, means securing said tone arm to said pin for pivotal motion thereabout including at least one member depending from said tone arm and formed with a pin-receiving opening engaged about said pin, a reference surface rigidly secured to said tone arm and aligned with said pin-receiving opening, said bearing contact of said pin being operatively engaged with said reference surface, and bias means for maintaining engagement of said reference surface with said bearing contact.

6. A mounting assembly for a phonograph tone arm comprising a tone arm support bracket mounted for rotation about a vertical axis, said support bracket including a pair of upstanding parallel projections each of which is formed with pin-receiving openings one aligned with the other, a tone arm pivot bracket secured to said tone arm, said pivot bracket having a pair of downwardly extending parallel extensions spaced outwardly of said upstanding projections of said pivot bracket and aligned therewith, one of said downward extensions having a pin-locating surface spaced outwardly therefrom and in alignment with said pin-receiving openings, a pivot pin longer in length than the distance between said downward extensions, said pin having formed on one end thereof a bearing surface cooperating with said pin-locating surface and shaped to provide a point contact on the central axis of said pin, clamping means for locating said pin rigidly to said support bracket with said bearing surface in operative relation to said pin-locating surface, and biasing means for maintaining contact between said bearing surface and said pin-locating surface.

7. A mounting assembly for a phonograph tone arm comprising a tone arm support bracket mounted for rotation about a vertical axis, said support bracket including a pair of upstanding parallel projections each of which is formed with pin-receiving openings one aligned with the other, a pair of downwardly extending parallel extensions depending from said tone arm and spaced outwardly of said upstanding projections and aligned therewith, one of said downward extensions having a pin-locating surface spaced outwardly therefrom and in alignment with said pin-receiving openings, a pivot pin longer in length than the distance between said downward extensions, said pin having formed on one end thereof a bearing surface shaped to provide a point contact on the central axis of said pin, clamping means for locating said pin rigidly on said support bracket with said bearing surface in operative relation to said pin-locating surface, and biasing means for maintaining contact between said bearing surface and said pin-locating surface.

8. A phonograph tone arm mounting assembly comprising a fixed vertical shaft, a bearing surface formed on the upper end of said shaft, a bearing pin, means carried on said shaft securing said pin in horizontal orientation and in contact with said shaft at said bearing surface for movement in a horizontal plane, a point contact formed at one end of said pin, means securing said tone arm to said pin for pivotal motion thereabout, a reference surface rigidly secured to said tone arm, said point contact of said pin being operatively engaged with said surface, said tone arm being rotatable in a horizontal plane about said shaft and in a vertical plane about said pin.

9. A phonograph tone arm mounting assembly comprising a fixed vertical shaft, a bearing surface formed on the upper end of said shaft, a bearing pin, bearing means carried on said shaft securing said pin in horizontal orientation and in contact with said shaft at said bearing surface for movement in a horizontal plane, a point contact formed at one end of said pin, means securing said tone arm to said pin for pivotal motion thereabout, a reference surface rigidly secured to said tone arm, said point contact of said pin being operatively engaged with said surface, and bias means maintaining engagement of said reference surface with said point contact, said tone arm being rotatable in a horizontal plane about said shaft and in a vertical plane about said pin.

10. A phonograph tone arm mounting assembly comprising a fixed vertical shaft, a bearing surface formed on the upper end of said shaft, a bearing pin, bearing means on said shaft securing said pin in horizontal orientation and in contact with said shaft at said bearing surface for movement in a horizontal plane, a point contact formed at one end of said pin, means securing said tone arm to said pin for pivotal motion thereabout including members depending from said tone arm formed with a pair of aligned pin-receiving bearing openings engaged about said pin, a reference surface rigidly secured to one of said depending members and aligned with said pin-receiving openings, said point contact of said pin being operatively engaged with said reference surface, and bias means maintaining engagement of said reference surface with said point contact, said tone arm being rotatable in a horizontal plane about said shaft and in a vertical plane about said pin.

11. A phonograph tone arm mounting assembly comprising a fixed vertical shaft, a bearing surface formed on the upper end of said shaft, a bearing pin, bearing means on said shaft securing said pin in horizontal orientation and in contact with said shaft at said bearing surface for movement in a horziontal plane, a point contact formed at one end of said pin, bearing means on said tone arm engaged about said pin for pivotal motion, a reference surface rigidly secured to said tone arm, said point contact of said pin being operatively engaged with said reference surface, and means maintaining engagement of said reference surface with said point contact, said tone arm being rotatable in a horizontal plane about said shaft and in a vertical plane about said pin.

References Cited by the Examiner

UNITED STATES PATENTS

| | | | |
|---|---|---|---|
| 2,577,051 | 12/51 | Voegtlin | 274—23 |
| 2,625,400 | 1/53 | Lingenbrink | 274—23 |
| 2,972,484 | 2/61 | Meoni | 274—23 |

LOUIS J. CAPOZI, *Primary Examiner.*

ANTONIO F. GUIDA, *Examiner.*